(12) United States Patent
Mair et al.

(10) Patent No.: US 9,227,506 B2
(45) Date of Patent: Jan. 5, 2016

(54) DRIVE DEVICE FOR AN INDIVIDUAL WHEEL OF A MOTOR VEHICLE

(75) Inventors: Ulrich Mair, Friedrichshafen (DE); Stephan Pollmeyer, Friedrichshafen (DE); Martin Munster, Munchen-Laim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 20 days.

(21) Appl. No.: 14/131,206

(22) PCT Filed: Jul. 5, 2012

(86) PCT No.: PCT/EP2012/063117
§ 371 (c)(1),
(2), (4) Date: Jan. 7, 2014

(87) PCT Pub. No.: WO2013/017369
PCT Pub. Date: Feb. 7, 2013

(65) Prior Publication Data
US 2014/0144718 A1 May 29, 2014

(30) Foreign Application Priority Data
Aug. 2, 2011 (DE) .......................... 10 2011 080 236

(51) Int. Cl.
*B60K 5/02* (2006.01)
*B60K 7/00* (2006.01)
(Continued)

(52) U.S. Cl.
CPC ................. *B60K 7/0007* (2013.01); *B60L 7/26* (2013.01); *B60T 1/062* (2013.01); *F16H 63/34* (2013.01); *F16H 63/3416* (2013.01); *H02K 7/102* (2013.01); *H02K 7/116* (2013.01); *B60K 17/046* (2013.01); *B60K 2007/0038* (2013.01);
(Continued)

(58) Field of Classification Search
CPC ........................................................ B60K 5/02
USPC ............................................................. 180/55
See application file for complete search history.

(56) References Cited

U.S. PATENT DOCUMENTS 6,186,262 B1    2/2001  Mann et al.
2012/0041661 A1*  2/2012  Kaneko ......................... 701/70
(Continued)

FOREIGN PATENT DOCUMENTS

DE    195 33 141 C1    2/1997
DE    196 37 570 A1    3/1998
(Continued)

OTHER PUBLICATIONS

German Search Report Corresponding to 10 2011 080 236.3 mailed May 18, 2012.
(Continued)

*Primary Examiner* — John Walters
*Assistant Examiner* — James Triggs
(74) *Attorney, Agent, or Firm* — Davis & Bujold, P.L.L.C.; Michael J. Bujold

(57) ABSTRACT

A drive device located closely adjacent to the wheel for a single wheel of a motor vehicle. The drive device has an electric drive that has at least one driveshaft for the wheel. A gearing interacts with the at least one drive shaft for transmitting torque to drive the wheel and is connectable to the individual wheel. A locking mechanism is disposed to lock the wheel and is designed to block the gearing and/or the drive shaft.

19 Claims, 7 Drawing Sheets

(51) Int. Cl.
  *F16H 63/34* (2006.01)
  *H02K 7/102* (2006.01)
  *H02K 7/116* (2006.01)
  *B60T 1/06* (2006.01)
  *B60L 7/26* (2006.01)
  *B60K 17/04* (2006.01)

(52) U.S. Cl.
  CPC ..... *B60K2007/0061* (2013.01); *B60L 2220/44* (2013.01); *B60L 2220/46* (2013.01); *Y10T 74/19642* (2015.01)

(56) References Cited

U.S. PATENT DOCUMENTS

2012/0258831 A1   10/2012   Knoblauch et al.
2013/0303327 A1   11/2013   Pichler et al.

FOREIGN PATENT DOCUMENTS

| DE | 100 29 628 A1 | 3/2001 |
| DE | 10 2005 022 926 B3 | 2/2007 |
| DE | 20 2009 014 189 U1 | 4/2011 |
| DE | 10 2010 034 691 A1 | 2/2012 |
| EP | 1 719 656 A1 | 11/2006 |
| JP | 2005 212656 A | 8/2005 |
| JP | 2009 120127 A | 6/2009 |
| JP | 2011 057011 A | 3/2011 |

OTHER PUBLICATIONS

International Search Report Corresponding to PCT/EP2012/063117 mailed Jan. 15, 2013.
Written Opinion Corresponding to Corresponding to PCT/EP2012/063117 mailed Jan. 15, 2013.

* cited by examiner a)

b)

1

DRIVE DEVICE FOR AN INDIVIDUAL WHEEL OF A MOTOR VEHICLE

This application is a National Stage completion of PCT/EP2012/063117 filed Jul. 5, 2012, which claims priority from German patent application serial no. 10 2011 080 236.3 filed Aug. 2, 2011.

FIELD OF THE INVENTION

The invention relates to a drive device close to the wheel that is for an individual wheel of a motor vehicle and comprises electric drive means with at least one drive shaft for the wheel, and with a gearing that interacts with the least one drive shaft to transmit torque to drive the wheel and is connectable to the individual wheel. The invention also relates to a vehicle axle for two wheels of a motor vehicle, as well as use of a drive device and use of a vehicle axle.

BACKGROUND OF THE INVENTION

Each vehicle that is approved for driving on public roads, especially passenger cars and trucks, requires a service brake for braking a vehicle as well as a parking brake to prevent the vehicle from rolling away when at a standstill. With vehicles that have a manual transmission, it is known to design the parking brake as a so-called handbrake which is activated by means of a manually actuated parking lever. The parking lever is normally provided with a releasable blocking mechanism to fix the parking lever in at least one parked position, generally in the form of a ratchet-like locking mechanism. A button is provided at the end of the parking lever to release the blocking mechanism.

In the case of motor vehicles with an automatic transmission, a parking lock is additionally provided which can be engaged by means of the gear shift lever when the motor vehicle is at a standstill and, in addition to the parking brake, secures the vehicle from rolling away. The parking lock is disposed in the central drive train of the motor vehicle between the engine and wheel axles.

In the case of electric vehicles with a wheel hub drive, there is no central drivetrain, and hence only a certain amount of drag torque is provided by the electric motor in an electric vehicle. However, a disadvantage is that the drag torque of the electric motor is only sufficient to prevent the vehicle from rolling away on a substantially flat area.

SUMMARY OF THE INVENTION

An object of the present invention is therefore to enable an electric vehicle to be reliably secured from rolling away, especially on very steep roads.

The object is achieved with a drive device close to the wheel in that a locking mechanism is disposed to lock the wheel and is designed to block the gearing and/or the drive shaft.

Although applicable to any drive devices, the drive device will be described with reference to a drive of an individual motor vehicle wheel that is close to the wheel.

The term "close to the wheel" associated with the drive device preferably does not comprise either a wheel hub drive or a central drive which drives a number of wheels by means of gearing.

Described below is a drive device close to the wheel for a single wheel of a motor vehicle comprising electric drive means having at least one driveshaft for the wheel, and gearing that interacts with the at least one drive shaft to transmit torque to drive the wheel and is connectable to the individual wheel, and the drive device close to the wheel is characterized in that a locking mechanism is disposed to lock the wheel and is designed to block the gearing and/or the drive shaft.

Also described is a vehicle axle, in particular a torsion beam axle, for two wheels of a motor vehicle comprising a torsion profile, two trailing arms that are disposed on different sides of the torsion profile and that are each connected to a wheel carrier for one of the wheels of the motor vehicle, and the vehicle axle is characterized in that a drive device is disposed for the wheels that is designed to drive an individual wheel, and that the drive device, especially a gearing of the drive device, is designed as a trailing arm.

In addition, using a drive device as described herein achieves the aforementioned object.

Furthermore, the vehicle axle described herein can be used in a motor vehicle, especially in an electric vehicle.

By means of the configuration of a locking mechanism which engages with the transmission and/or the drive shaft such that the wheel, which is connected to the drive device via the transmission, is blocked, a rolling off or away of the electric vehicle is reliably prevented with a drive device in the proximity of the wheel. Furthermore, the drive device close to the wheel having the features described offers the advantage that, for example, the brake pads of the service brake for the respective wheel can be prevented from seizing or rusting tight, as occurs with the service brake in cold weather conditions and older motor vehicles having an internal combustion engine since part of the retentive force is provided by the parking lock. In addition, it is also ensured that each individual wheel is held separately by the locking mechanism. This also increases reliability since not all wheels are in contact with the road surface in a friction lock on uneven roads or when parking the electric vehicle at the edge of the road, and a vehicle rolls away more easily when the retentive force only acts on one wheel of a vehicle axle. This is reliably avoided with the drive device having the features described since each individual wheel is blocked by the locking mechanism, in contrast to vehicles with an internal combustion engine and manual transmission in which the vehicle is secured against rolling away by means of the handbrake which generally only acts on the rear wheels.

The locking mechanism usefully comprises a pawl and toothing which can be engaged for locking. The advantage is that this makes it possible to lock the gearing and/or drive shaft in an easy and reliable manner. To accomplish this, the toothing can be disposed indirectly or directly on the drive shaft or in the gearing itself. An additional advantage is that the locking mechanism is economical to manufacture.

The locking mechanism is advantageously electrically actuatable. "Electrically actuatable" also includes in particular electromechanical, electropneumatic or any other type of actuation of the locking mechanism that at least partially employs electrical means. In this manner, the locking mechanism can be actuated in the passenger compartment of the motor vehicle by means of a simple switch so that mechanical levers for a parking lock, as are conventional in motor vehicles with automatic transmissions, can be omitted. This can save installation space in the middle tunnel of the passenger compartment. This can then be used for controls for navigation systems, multimedia systems, etc.

An energy accumulator, especially electrical and/or mechanical, is usefully disposed which interacts with the locking mechanism to actuate it. The reliability of the locking mechanism is further enhanced in this manner since, for example, the locking mechanism can still be actuated if there is a power failure in the onboard electronics of the motor vehicle.

The locking mechanism is advantageously disposed on the drive shaft of the electric drive means. The vehicle load from the wheel acting on the locking mechanism disposed on the gearing between the locking mechanism and wheel is thereby reduced; accordingly, the locking mechanism is only required to provide less retentive force than would be necessary if the locking mechanism were to act directly on the wheel. Once the locking mechanism is actuated, all of the teeth, bearings, etc. of the gearing are subject to a load and, in the final analysis, reduce the retentive force to be applied to the wheel by the locking mechanism.

The gearing usefully comprises at least one transmission device. It is thereby possible, on the one hand, to flexibly adjust the torque provided by the electric drive means to the wheel. On the other hand, the load of the vehicle acting on the locking mechanism is further reduced by the transmission device in the gearing.

The locking mechanism is advantageously disposed between the at least one transmission device and the electric drive means. The advantage which is thereby achieved is that the locking mechanism becomes insensitive to external environmental influences, and thus the life of the locking mechanism can be increased. Furthermore, the locking mechanism can be easily integrated into a lubrication circuit for the gearing without having to dispose a large number of additional channels, etc. for lubricating the locking mechanism.

The locking mechanism is usefully disposed on the side of the drive shaft facing away from a transmission device. If for example the locking mechanism is disposed on the end of the drive shaft of the electric drive means, the locking mechanism is easily accessible from the outside and can therefore be more easily serviced. In addition, this can be easily integrated and/or retrofitted into existing drive devices.

The locking mechanism is advantageously disposed on the at least one transmission device. The respective teeth and/or the gear wheels, etc. of the transmission device can be used to at least partially form the locking mechanism. In this manner, no additional component is necessary to block the drive shaft. This lowers the overall manufacturing costs of the drive device. It is, for example, possible to provide the corresponding toothing for a locking mechanism by means of a carrier of the planetary gearing when the transmission device is in the form of a planetary gearing. In a pinion/spur gear arrangement, the toothing of the locking mechanism can be facilitated by the spur gear so that on the one hand, the required space for the locking mechanism can be minimized, and on the other hand an economical locking mechanism is enabled since a component for the otherwise necessary toothing can be omitted.

The locking mechanism is usefully disposed on an output shaft of the at least one transmission device. In this manner, depending on the location or position of the transmission device in the gearing, for example when the output shaft is mounted directly on the wheel bearing and the locking mechanism is disposed on said output shaft, the other gearing components between the locking mechanism and drive shaft are not subject to a load, which significantly increases the life of these gearing components. If the locking mechanism is disposed on the transmission device which is directly connected on one side to the drive shaft of the electric drive means, less retentive force is required by the locking mechanism to lock a wheel since additional gearing components are disposed between the locking mechanism and wheel, and they reduce the necessary retentive force to block and/or restrain a wheel of a motor vehicle.

The at least one transmission device is preferably designed as a planetary gearing and/or as a pinion/spur gear arrangement. Extremely reliable transmission devices can thereby be provided for the drive device as required by the application.

The drive device of the motor vehicle axle described herein is usefully designed so as to yield the advantage that a motor vehicle axle with a drive and locking mechanism for a drive close to the wheel of a motor vehicle, especially an electric vehicle, can be easily and economically made available without having to provide additional components for a locking mechanism in the form of gearing, tunnels, or the like. This makes it possible to economically manufacture a vehicle axle with a drive device and locking mechanism.

Of course, the aforementioned features and those to be explained below can be used in other combinations or alone and not just in the indicated combination without departing from the framework of the present invention.

Preferred exemplary embodiments of the invention are depicted in the drawings and will be further explained in the subsequent description, wherein the same reference numbers refer to the same, similar, or functionally equivalent components or elements.

BRIEF DESCRIPTION OF THE DRAWINGS

In schematic form.

DETAILED DESCRIPTION OF THE PREFERRED EMBODIMENTS

Figure 1:
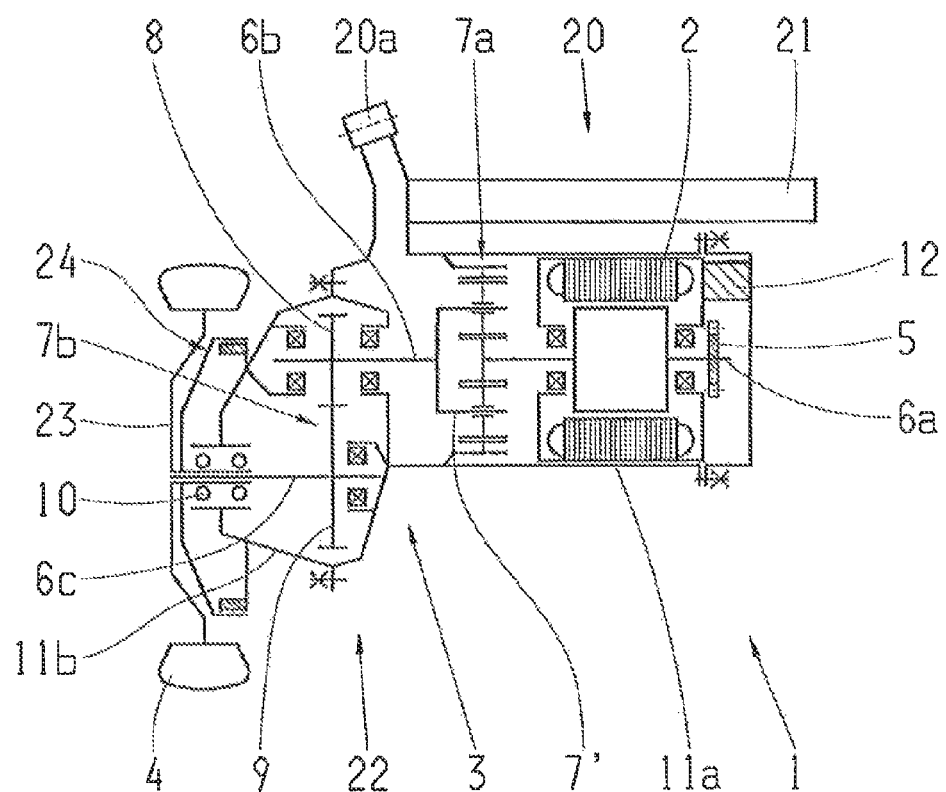
FIG. 1 Shows a drive device close to the wheel according to a first embodiment of the present invention.

FIG. 1 shows a drive device close to the wheel according to a first embodiment of the present invention.

In FIG. 1, reference number 1 designates a drive device close to the wheel for an individual wheel 4 of a motor vehicle. The drive device 1 comprises an electric motor 2 that has a driveshaft 6a. The electric motor 2 is connected to a gearing 3, wherein the gearing 3 is subsequently connected to the wheel 4. If the electric motor 2 is actuated, the force from the electric motor 2 is transmitted via the gearing 3 to the wheel 4, and the wheel 4 rotates. The drive shaft 6a of the electric motor 2 is connected to a planetary gearing 7a of the gearing 3, wherein the drive shaft 6a forms the input shaft for the planetary gearing 7a. The planetary gearing 7a furthermore has a carrier 7' and an output shaft 6b that is connected to a pinion/spur gear arrangement 7b. On the side facing away from the planetary gearing 7a, the connecting shaft 6b comprises a pinion 8 that interacts with a spur gear 9 to transmit torque. The spur gear 9 comprises an output shaft 6c which is rotatably mounted, in particular on a wheel bearing 10, and serves to drive the wheel 4.

On the side of the electric motor 2 facing away from the gearing 3, a locking mechanism 5 is disposed on the driveshaft 6a that makes it possible to block the driveshaft 6a and hence the gearing 3 and finally the wheel 4. If the locking mechanism 5 is released, the driveshaft 6a can again be driven by the electric motor 2, and subsequently drives the wheel 4 by means of the gearing 3. If the locking mechanism 5 is engaged, it blocks the drive shaft 6a and hence also the wheel 4. On the whole, the motor vehicle is then secured against rolling away.

Within the area of the vehicle preferably close to the electric motor 3, an energy accumulator 12 is disposed e.g. in the form of a buffer battery that provides electrical energy for an electrically actuatable locking mechanism 5. Even when a power supply of the motor vehicle fails, the locking mechanism 5 is at least actuatable so that, on the whole, the motor vehicle can still be secured against rolling away. The energy accumulator 12 can also be designed as a mechanical energy accumulator, e.g. in the form of a spring, so that the locking mechanism 5 can still be actuated even when the vehicle is at a standstill.

According to FIG. 1, the energy accumulator 12 of the driveshaft 6a, the locking mechanism 5, as well as the planetary gearing 7a and at least part of the driveshaft 6b, as well as the carrier 7' of the planetary gearing 7a are disposed in a housing 11a of the electric motor 2. The driveshaft 6a and connecting shaft 6b are disposed substantially parallel to the path of a control arm 21 of a torsion beam axle 20. The pinion/spur gear arrangement 7b comprising the pinion 8 and the spur gear 9, the output shaft 6b and a part of the connecting shaft 6b, as well as the wheel bearing 10, are disposed in a wheel-side housing 11b that is connected to the housing 11a of the electric motor 2. Furthermore, a wheel carrier 23 is disposed in the area of the wheel 4 in a known manner along with a brake 24 that functions as a service brake to brake the vehicle during the ongoing operation of the vehicle. Overall, at least part of the electric motor 2 and gearing 3 is designed as a trailing arm 22 of the torsion beam 20. The torsion beam axle 20 is disposed such that it is rotatably mounted in the motor vehicle by means of the torsion beam bearing 20a. Furthermore, the driveshaft 6a, connecting shaft 6b and output shaft 6c of the electric motor 2 and the gearing 3 are also correspondingly rotatably mounted.

Figure 2:
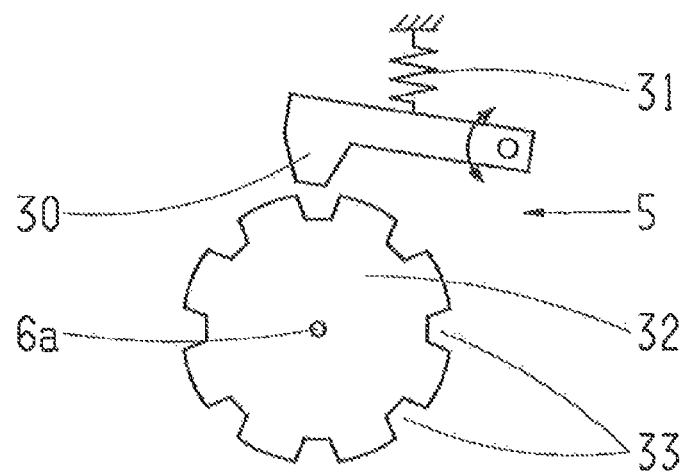
FIG. 2a, 2b Shows a locking mechanism with and without actuation.
Figure 2:
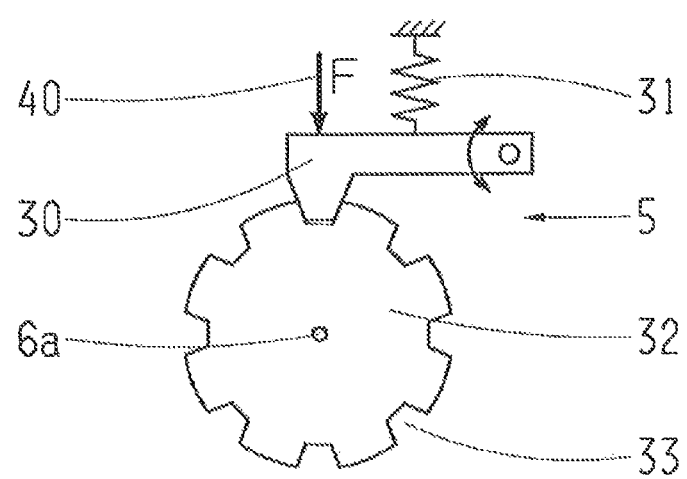

FIGS. 2a and 2b show a locking mechanism with and without actuation.

FIG. 2a shows a locking mechanism 5 in an open state. The locking mechanism 5 has toothing 33 that is formed on a parking lock gear 32. The parking lock gear 32 is, for example, connected to rotate conjointly with the drive axle 6a. Furthermore, a pawl 30 is provided that is non-rotatably disposed on a structure of a motor vehicle and can be engaged with a peripheral toothing 33 of the parking lock gear 32. The pawl 30 is also connected to a return spring 31 such that, in an unloaded state, the locking mechanism 5 is open, and the drive axle 6a can rotate freely. Of course, the parking lock gear 32 can also be disposed so as to rotate conjointly on the connecting shaft 6b or the output shaft 6c.

In FIG. 2b, a force 40 is applied against the spring force of the return spring 31 so that the pawl 30 engages with the toothing 33 of the parking lock gear 32. In this manner, the parking lock gear 32 can no longer rotate, and the parking lot gear 32 also blocks the drive axle 6a. Overall, the rotation of the wheel 4 is thereby prevented, and the vehicle is secured against rolling away, for example on a steep road.

Figure 3:
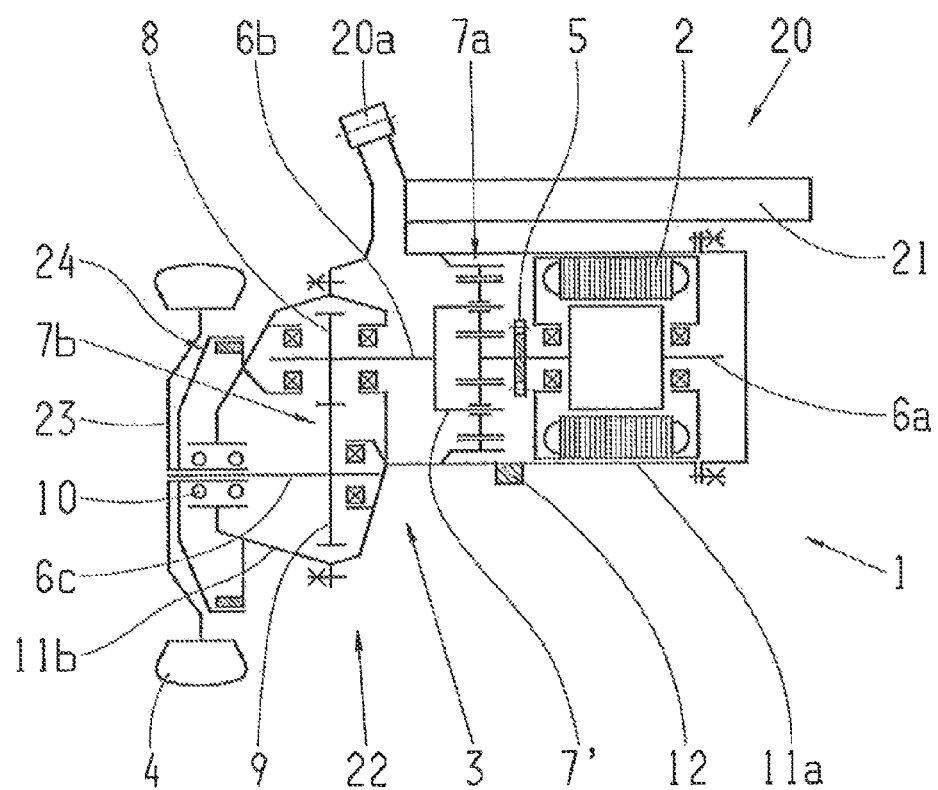
FIG. 3 Shows a drive device close to the wheel according to a second embodiment of the present invention.

FIG. 3 shows a drive device close to the wheel according to a first embodiment of the present invention.

Basically, FIG. 3 shows a drive device close to the wheel 1 according to FIG. 1. In contrast to FIG. 1, the locking mechanism 5 is disposed between the electric motor 2 and the gearing 3, or more precisely, on the drive shaft 6a between the electric motor 2 and planetary gearing 7a. Also in contrast to FIG. 1, the energy accumulator 12 in FIG. 3 is disposed on an outer side of the housing 11a of the electric motor 2. As portrayed in FIG. 1 as well as the following figures, the energy accumulator 12 interacts with the locking mechanism 5 to actuate it. The locking mechanism 5 is operatively connected to the drive shaft 6a, designed as a sun shaft for the planetary gearing 7a, in order to lock it. The vehicle load acting on the locking mechanism 5 is reduced by means of the transmission ratio of the transmission devices 7b, 7a acting between the locking mechanism 5 and wheel 4 so that the locking mechanism 5 must provide less retaining force to hold the wheel 4, in comparison to a direct connection between the locking mechanism 5 and wheel 4, in order to secure the vehicle against rolling away.

Figure 4:
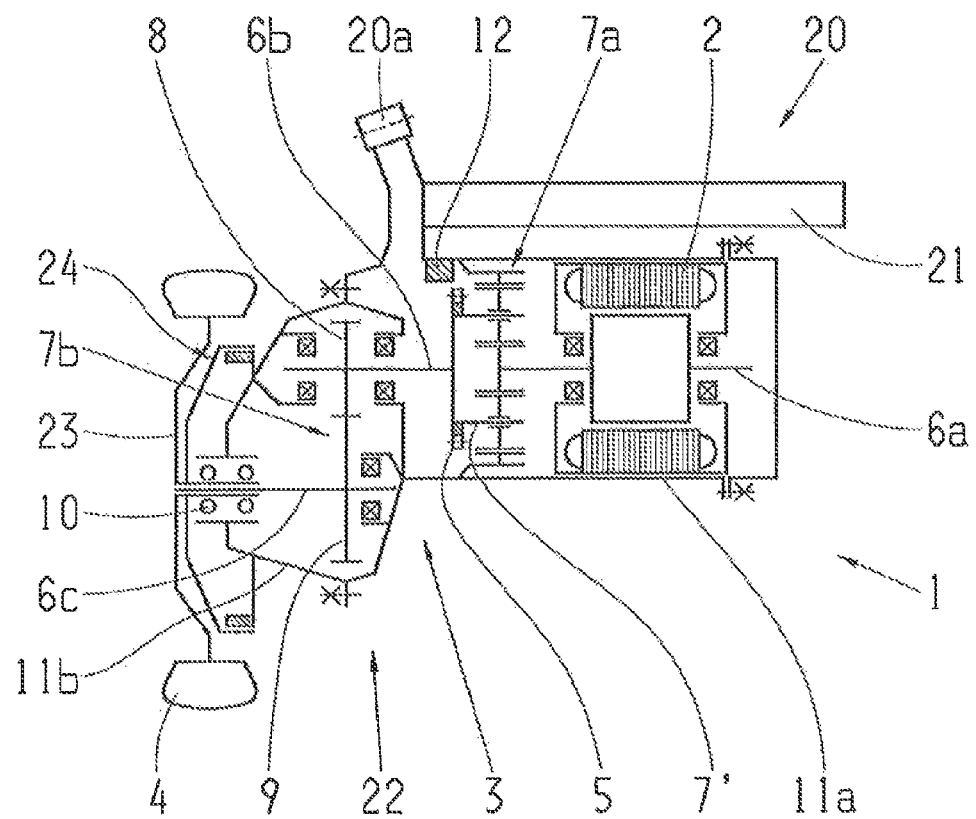
FIG. 4 Shows a drive device close to the wheel according to a third embodiment of the present invention.

FIG. 4 shows a drive device close to the wheel according to a third embodiment of the present invention.

Basically, FIG. 4 shows a drive device close to the wheel 1 according to FIG. 1. In contrast to FIG. 1, the locking mechanism 5 is disposed on the carrier 7' of the planetary gearing 7a. The toothing 33 is provided by the carrier 7' of the planetary gearing 7a so that no additional component, especially a parking lock gear 32 (see FIG. 2), is necessary. Simple and economical production of the drive device 1 is thereby feasible. At the same time, the drive device close to the wheel 1 is consequently extremely compact.

Figure 5:
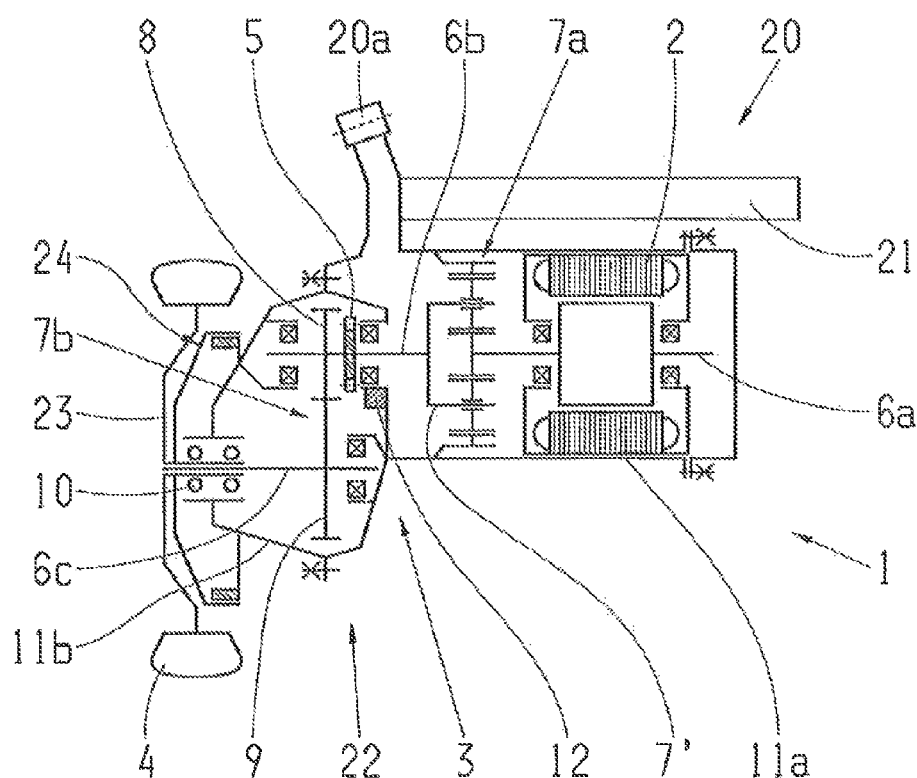
FIG. 5 Shows a drive device close to the wheel according to a fourth embodiment of the present invention.

FIG. 5 shows a drive device close to the wheel according to a fourth embodiment of the present invention.

Basically, FIG. 5 shows a drive device close to the wheel 1 according to FIG. 1. In contrast to FIG. 1, the locking mechanism 5 is disposed on the connecting shaft 6b between the planetary gearing 7a and the pinion 8. Here as well, reduced retaining force is enabled by the gearing elements disposed between the wheel 4 and a locking mechanism 5, in particular the transmission device in the form of a pinion/spur gear arrangement 7b. Furthermore, the locking mechanism 5, in contrast to the embodiments in FIGS. 1, 3 and 4, is not disposed in the housing 11a of the electric motor 2, but rather in the housing close to the wheel 1ib. Likewise, the energy accumulator 12 is disposed in the housing close to the wheel 1ib and interacts with the locking mechanism 5 to actuate it.

Figure 6:
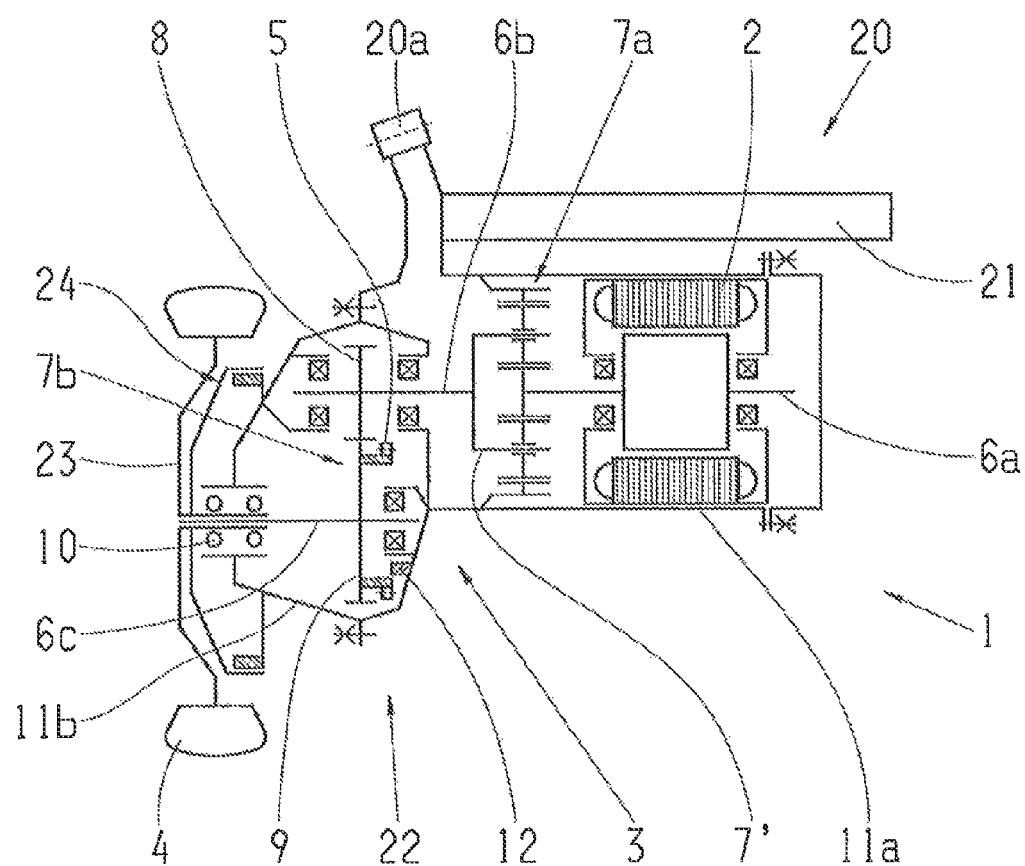
FIG. 6 Shows a drive device close to the wheel according to a fifth embodiment of the present invention.

FIG. 6 shows a drive device close to the wheel according to a fifth embodiment of the present invention.

Basically, FIG. 6 shows a drive device close to the wheel 1 according to FIG. 1. In contrast to FIG. 1, the energy accumulator 12 is disposed in the housing close to the wheel 11b and interacts with the locking mechanism 5, also disposed in the housing close to the wheel 11b, to actuate it. In FIG. 6, the locking mechanism 5 is placed on the spur gear 9. In this manner, the gearing components between the locking mechanism 5 and drive shaft 6a of the electric motor 2 are relieved of their load which increases their life. In addition, the locking mechanism 5 is economical to produce since the parking lock gear 32 is formed by the spur gear 9. An additional component in the form of the parking lock gear 32 can thereby be eliminated, which reduces the overall production costs for the locking mechanism 5 and hence also for the drive device close to the wheel 1.

Figure 7:
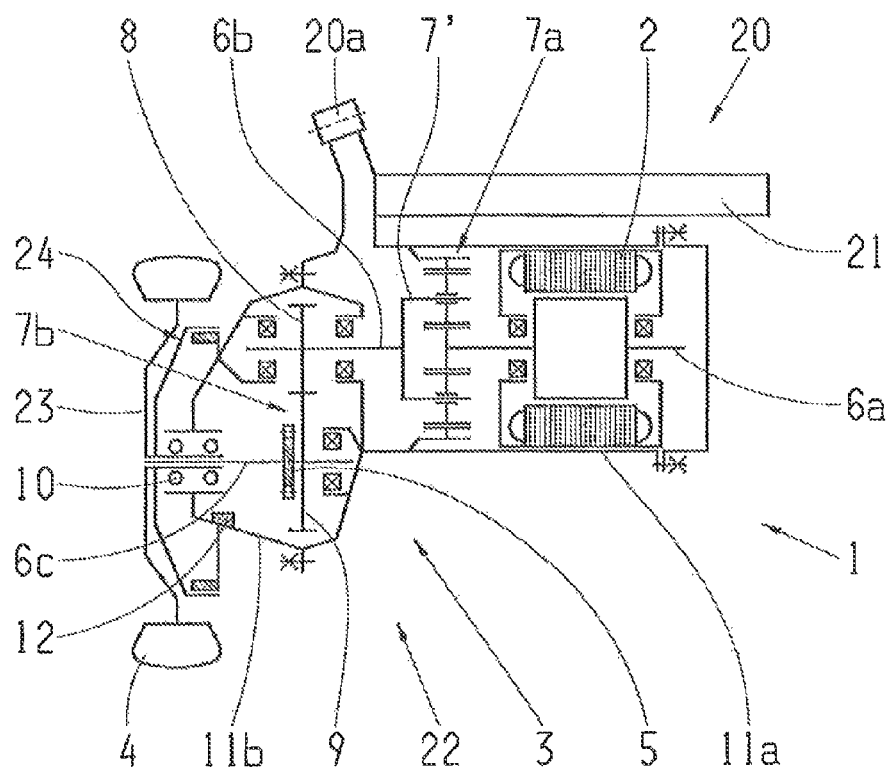
FIG. 7 Shows a drive device close to the wheel according to a sixth embodiment of the present invention.

FIG. 7 shows a drive device close to the wheel according to a sixth embodiment of the present invention.

Basically, FIG. 7 shows a drive device close to the wheel 1 according to FIG. 1. In contrast to FIG. 1, the energy accumulator 12 is disposed in the housing 11b close to the wheel and interacts with the locking mechanism 5 to actuate it. The locking mechanism 5 is also disposed in the housing close to the wheel 11b and, in FIG. 7, is disposed on the output shaft 6c which is designed as a spur gear shaft of the pinion/spur gear arrangement 7b. As in FIG. 6, the secondary gearing components of the gearing 3, i.e., the gearing components that are disposed between the locking mechanism 5 and driveshaft 6a of the electric motor 2, are load-free, which increases their life. In addition, the arrangement of the locking mechanism 5 according to FIG. 7 offers the advantage that the drive device close to the wheel 1 can be designed compactly.

In summary, the invention, among other things, possesses the advantages that a motor vehicle can be secured in an extremely reliable manner against an undesired rolling off or rolling away by means of a drive device close to the wheel according to the present invention. In addition, it is also possible to reliably actuate the drive device close to the wheel since, for example, a seizing or rusting tight of the service brake as the handbrake or parking brake under inclement weather conditions can be reduced by arranging the locking mechanism in the drive device close to the wheel.

Although the present invention was described above with reference to preferred exemplary embodiments, it is not restricted to them and can be modified in a variety of ways.

REFERENCE SIGNS

1 Drive device
2 Electric motor
3 Gearing
4 Wheel
Locking mechanism
6a Drive shaft
6b Connecting shaft
6c Output shaft
7a Planetary gearing
7b Pinion/spur gear arrangement
7' Carrier
8 Pinion
9 Spur gear
10 Wheel bearing
11a Electric motor housing
11b Wheel-side housing
12 Energy accumulator
20 Torsion beam axle
20a Torsion beam bearing
21 Torsion profile
22 Trailing arm
23 Wheel carrier
24 Brake
30 Pawl
31 Return spring
32 Parking lock brake
33 Toothing
40 Force

The invention claimed is:

1. A drive device, adjacent to a single wheel (4) of a motor vehicle, comprising:
an electric drive (2) having at least one drive shaft (6a) for driving the wheel (4), and
a gearing interacting with the at least one drive shaft (6a) for transmitting torque to drive the wheel (4), and the gearing being connectable to the wheel, and
a locking mechanism (5) being disposed to lock the wheel (4) and designed to block at least one of the gearing (3) and the drive shaft (6a);
wherein the gearing (3) comprises at least one transmission device (7a, 7b);
the locking mechanism (5) is disposed between the at least one transmission device (7a, 7b) and the electric drive (2); and
the at least one transmissions device (7a, 7b) is at least one of a planetary gearing (7a) and a pinion/spur gear arrangement (7b).

2. The drive device (1) according to claim 1, wherein the locking mechanism (5) comprises a pawl (30) and a toothing (33) that are engagable with one another for locking at least one of the gearing (3) and the drive shaft (6a).

3. The drive device according to claim 1, wherein the locking mechanism (5) is electrically actuatable.

4. The drive device according to claim 1, wherein at least one of an electrical and a mechanical energy accumulator (12) is disposed so as to interact with and actuate the locking mechanism (5).

5. The drive device according to claim 1, wherein the locking mechanism (5) is disposed on the drive shaft (6a) of the electric drive (2).

6. The drive device according to claim 1, wherein the locking mechanism (5) is disposed on the at least one transmission device (7a, 7b).

7. The drive device according to claim 1, wherein the locking mechanism (5) is disposed on an output shaft (6b, 6c) of the at least one transmission device (7a, 7b).

8. A motor vehicle axle (20) for two wheels of a motor vehicle comprising:
a torsion profile (21),
two trailing arms (22) that are disposed on different sides of the torsion profile (21) and each connected to a wheel carrier (23) for one of the wheels (4) of the motor vehicle,
a drive device (1) being disposed for each of the wheels (4) and designed to drive a respective individual wheel (4), and
the drive device (1) having a gearing (3) that is designed as the trailing arm (22).

9. The motor vehicle axle (20) according to claim 8, wherein the drive device comprises an electric drive (2) having at least one drive shaft (6a) for driving the wheel (4),
a gearing that interacts with the at least one drive shaft (6a) for transmitting torque to drive the wheel (4), and the gearing is connectable to the individual wheel, and
a locking mechanism (5) is disposed to lock the wheel (4) and designed to block at least one of the gearing (3) and the drive shaft (6a).

10. A drive device for driving a single wheel of a motor vehicle, the drive device comprising:
an electric machine having a drive shaft that drives a planetary gearset,
the planetary gearset having a connecting shaft for transmitting drive to the wheel of the motor vehicle,
the drive device being connected to a vehicle axle adjacent the wheel,
a parking lock gearwheel being fixed to one of the drive shaft of the electric machine and the connecting shaft, and
a pawl being pivotally fixed with respect to the parking lock gearwheel and actuatable so as to engage the parking lock gearwheel and prevent rotation of one of the drive shaft of the electric machine and the connecting shaft.

11. A drive device, adjacent to a single wheel (4) of a motor vehicle, comprising:
an electric drive (2) having at least one drive shaft (6a) for driving the wheel (4), and a gearing interacting with the at least one drive shaft (6a) for transmitting torque to drive the wheel (4), and the gearing being connectable to the wheel, and a locking mechanism (5) being disposed to lock the wheel (4) and designed to block at least one of the gearing (3) and the drive shaft (6a);

wherein the gearing (3) comprises at least one transmission device (7a, 7b); and the locking mechanism (5) is disposed on an output shaft (6b, 6c) of the at least one transmission device (7a, 7b).

12. The drive device (1) according to claim 11, wherein the locking mechanism comprises a pawl and a toothing that are engagable with one another for locking at least one of the gearing and the drive shaft.

13. The drive device according to claim 11, wherein the locking mechanism (5) is electrically actuatable.

14. The drive device according to claim 11, wherein at least one of an electrical and a mechanical energy accumulator is disposed so as to interact with and actuate the locking mechanism.

15. The drive device according to claim 11, wherein the locking mechanism is disposed on the drive shaft of the electric drive.

16. The drive device according to claim 15, wherein the locking mechanism is connected to the drive shaft on a motor side facing away from the transmission device.

17. The drive device according to claim 11, wherein the locking mechanism is disposed on the at least one transmission device.

18. The drive device according to claim 11, wherein the locking mechanism is disposed on an output shaft of the at least one transmission device.

19. The drive device according to claim 11, wherein the locking mechanism (5) is connected to the drive shaft on a motor side facing away from the transmission device (7a, 7b).

\* \* \* \* \*